United States Patent
Yamamoto et al.

(10) Patent No.: US 6,613,433 B2
(45) Date of Patent: Sep. 2, 2003

(54) POLARIZING OPTICAL COMPOSITE AND POLARIZING LENS

(75) Inventors: Tamenobu Yamamoto, Higashi-Osaka (JP); Masahiko Okamoto, Higashi-Osaka (JP); Koichiro Oka, Higashi-Osaka (JP)

(73) Assignee: Yamamoto Kogaku Co., Ltd., Higashi-Osaka (JP)

( * ) Notice: Subject to any disclaimer, the term of this patent is extended or adjusted under 35 U.S.C. 154(b) by 0 days.

(21) Appl. No.: 09/945,738

(22) Filed: Sep. 5, 2001

(65) Prior Publication Data

US 2002/0044352 A1 Apr. 18, 2002

(30) Foreign Application Priority Data

Sep. 12, 2000 (JP) .......................................... 2000-277104

(51) Int. Cl.$^7$ .................................................. B32B 9/04
(52) U.S. Cl. .................................. 428/411.1; 264/176.1; 351/163; 359/494; 528/196; 528/198; 528/271; 528/272; 428/412
(58) Field of Search ............................... 528/196, 198, 528/271, 272; 359/494; 264/176.1; 351/163; 428/411.1, 412

(56) References Cited

U.S. PATENT DOCUMENTS

| | | | |
|---|---|---|---|
| 5,702,813 A | | 12/1997 | Murata et al. |
| 5,805,336 A | * | 9/1998 | Dalzell et al. ............... 359/494 |
| 5,827,614 A | * | 10/1998 | Bhalakia et al. .......... 428/411.1 |
| 5,909,314 A | * | 6/1999 | Oka et al. ................... 359/582 |
| 6,328,446 B1 | * | 12/2001 | Bhalakia et al. ............ 351/163 |

FOREIGN PATENT DOCUMENTS

JP        08-052817        2/1996

* cited by examiner

*Primary Examiner*—Terressa M. Boykin
(74) *Attorney, Agent, or Firm*—Oblon, Spivak, McClelland, Maier & Neustadt, P.C.

(57) ABSTRACT

A polarizing optical composite equipped with a polarizing plate holding a polarizer sheet layer between two protective sheet layers, wherein the polarizing sheet layer has on one side thereof at least two layers, in a body, constructed of materials different each other. The polarizing optical composite has high impact resistance and high degree of polarization, and is used as, for example, goggles, sunglasses, and spectacles, which have high impact resistance, has more safety, and can prevent dazzling light.

24 Claims, No Drawings

POLARIZING OPTICAL COMPOSITE AND POLARIZING LENS

BACKGROUND OF THE INVENTION

The present invention relates to a technique of providing an optical composite having a large impact strength incorporated with a polarizer, such as a lens base material, which is used as goggles, sunglasses, prescription sunglasses, etc., each having impact strength.

Goggles and spectacles, which are used in sport fields such as skiing, snow boarding, ice skating, yachting, boating, bicycling, motorcycling, etc., and industrial fields such as general manufacturing industries, building and civil engineering, etc., are used for the purpose of preventing from dazzling by direct rays and deflected rays and also protecting eyes from winds, snows, rains, sea water, water, sands, chemicals, foreign matters, etc. Also, sunglasses for general use and prescription sunglasses are used for the purpose of preventing dazzling light and reflected light.

Hitherto, there are a polarizing glass lens formed by covering both surfaces of a polarizer sheet with a glass and a polarizing plastic lens formed by inserting a polarizing sheet in a mold and cast molding them, such as a polarizing CR-39 lens.

Also, an optical composite molded material, which is obtained by inserting a polarizing plate of a laminated layer structure formed by holding a polarizer sheet between two polycarbonate sheets in a mold, and further insert injection molding them such that a polycarbonate resin layer is heat-adhered to the polycarbonate sheets, is known (Japanese Patent Laid-Open No. 52817/1996).

In each case, a glass, CR-39, or a polycarbonate sheet is used as a protective sheet for a polarizer sheet, that is, a material of one kind only is used as a protective sheet.

In the above-described polarizing glass lens sheet formed by covering both surfaces of a polarizer sheet with glass, there are problems that the sheet is liable to be broken because of using a glass base material, and the workability is insufficient caused by that the base material is hardly subjected to thermoforming.

Also, in the polarizing plastic lens formed by inserting a polarizer sheet in a mold and cast molding, because a high technique is required for incorporating the polarizer sheet in the mold, and the polarizer sheet is shrunk and thermally decomposed by a heat received for long time during cast molding, there is a problem that the polarizing performance is lowered.

Furthermore, in the optical composite molded material obtained by an insert injection molding method so that the polycarbonate resin layer is heat-adhered to the polycarbonate sheet of the outermost layer of the polarizing plate as shown in Japanese Patent Laid-Open No. 52817/1996, because the polarizing plate is too near the resin layer, and thus the heat at molding is conducted straight to the polarizing plate, as in the case of cast molding, the polarizer sheet causes shrinkage and thermal decomposition, whereby there is a problem that the polarizing performance is lowered.

SUMMARY OF THE INVENTION

The technical means of the invention for solving the above-described technical problems is in the viewpoint of a polarizing optical composite equipped with a polarizing plate holding a polarizer sheet layer between two protective sheet layers, wherein the polarizer sheet layer has on one side thereof at least two layers, in a body, constructed of different materials each other.

Other technical means of the invention is in the viewpoint of a polarizing optical composite equipped with a polarizing plate holding a polarizer sheet layer between two protective sheet layers, wherein the polarizer sheet layer has, in a body, on the outside of one of the layer in contact with one side of the polarizer sheet and the layer in contact with other side of the polarizer sheet, a layer constructed of a different material or a material having a different composition from the layer in contact with the polarizer sheet.

Still other technical means of the invention is in the viewpoint of a polarizing optical composite equipped with a polarizing plate holding a polarizer sheet layer between two protective sheet layers, wherein the polarizing plate is laminated on both sides thereof with a layer constructed of a material different from the protective sheet layer via an adhesive, and the laminated layer is laminated, in a body, with a layer constructed of a different material or a material having a different composition from the protective layer in contact with the polarizer sheet layer.

Other technical means of the invention is in the viewpoint that laminated layers constructed of different materials each other or materials having different compositions each other are laminated on both sides of a polarizer sheet layer via an adhesive, and further a layer constructed of a different material or a material having a different composition from each of the laminated layers is laminated, in a body, on one of the laminated layers.

Still other technical means of the invention is in the viewpoint of a polarizing optical composite equipped with a polarizing plate holding a polarizer sheet layer between two protective sheet layers, wherein a layer constructed of a material different from the protective sheet layers is laminated, in a body, on both sides of the polarizing plate via an adhesive.

Other technical means of the invention is in the viewpoint of a polarizing lens equipped with a polarizing plate holding a polarizer sheet layer between two protective sheet layers, wherein the polarizer sheet layer has on one side thereof at least two layers, in a body, constructed of different materials each other.

Still other technical means of the invention is in the viewpoint of a polarizing lens equipped with a polarizing plate holding a polarizer sheet layer between two protective sheet layers, wherein layers laminated in a body are formed on the concave side of the protective sheet in contact with the polarizer sheet layer at the concave side of the polarizing lens, and the laminated layers are constructed of a different material or a different composition from the protective sheet layer in contact with the polarizer sheet layer at the convex side of the polarizing lens.

Other technical means of the invention is in the viewpoint that laminated layers constructed of different materials or materials of different compositions from each other are laminated on both sides of a polarizer sheet layer via an adhesive, and further, a layer constructed of a different material or a material of a different composition from each of the laminated layers is laminated, in a body, on one side of the laminated layers.

Still other technical means of the invention is in the viewpoint that each of both sides of the polarizer sheet layer is equipped with a polarizing plate formed by laminating protective sheets constructed of a triacetate, a film is stuck to one side of the polarizing plate, and by injection molding the same material as the film by an in-mold treatment, the film is integrated with the polarizing plate.

Other technical means of the invention is in the viewpoint of being equipped with a polarizing plate formed by laminating a protective sheet layer constructed of a triacetate on one side of a polarizer sheet layer, and also laminating a protective sheet layer constructed of a different material or a triacetate of a different composition from the triacetate on the other side of the polarizer sheet layer, a film is stuck to one side of the polarizing plate, and by injection molding the same material as the film by an in-mold treatment, the film is integrated with the polarizing plate.

Still other technical means of the invention is in the viewpoint of a polarizing lens equipped with a polarizing plate holding a polarizer sheet layer between two protective sheet layers, wherein the protective sheet layers of the polarizing plate are each constructed of a polycarbonate having a different composition each other, a film is stuck to one side of the polarizing plate, and by injection molding the same material as the film by an in-mold treatment, the film is integrated with the polarizing plate.

Other technical means of the invention is in the viewpoint of being equipped with a polarizing plate formed by laminating a protective sheet layer constructed of a triacetate on both sides of a polarizer sheet layer, wherein a polycarbonate film is laminated on one side of the polarizing plate, and by injection molding polycarbonate onto the film surface of the polycarbonate film by an in-mold treatment, the polycarbonate film is integrated with the polarizing plate.

Still other technical means of the invention is in the viewpoint of being equipped with a polarizing plate formed by laminating a protective sheet layer constructed of a triacetate on both sides of a polarizer sheet layer, wherein a nylon film is laminated on one side of the polarizing plate, and by injection molding nylon onto the film surface of the nylon film by an in-mold treatment, the nylon film is integrated with the polarizing plate.

Other technical means of the invention is in the viewpoint of a polarizing optical composite equipped with a polarizing plate holding a polarizer sheet layer between two protective sheet layers, wherein as the protective sheet layer, a material selected from the sheets of thermoplastic resins including a polyamide-base; a polyester-base; a polystyrene-base; an acrylic-base including homopolymers and copolymers of, e.g., methyl methacrylate or cyclohexyl methacrylate; a vinyl chloride-base; a polystyrene/methyl methacrylate-base; an acrylonitrile/styrene-base; poly-4-methylpentene-1; a main chain hydrocarbon-base having an andamantan ring or a cyclopentane ring as the main chain; a polyurethane-base; and a cellulose-base such as triacetyl cellulose, etc.; and a film is stuck to one of the protective sheet layer, by injection molding the material same as that of the film by an in-mold treatment, the film is integrated with the polarizing plate, and also the polarizing plate has, in a body, at least two layers constructed of different materials each other at the concave side thereof.

DESCRIPTION OF PREFERRED EMBODIMENTS

Then, the polarizing plate used in the invention is explained. The polarizing plate of the invention has a laminated structure of holding one polarizer sheet layer between two protective sheet layers.

The polarizer sheet layer is usually a uniaxially oriented sheet of a resin such as polyvinyl alcohol, polyvinyl acetal, polyvinyl butyral, etc., having a uniform thickness of 0.1 mm or thinner or a uniaxially oriented sheet obtained by subjecting the sheet to a stabilization treatment such as formalation, etc. The sheet itself has a definite polarizing performance, but for the practical use, the degree of polarization is at least 80%, and preferably at least 95%.

For obtaining a high polarization degree, it is carried out to dope the uniaxially oriented sheet with iodine or a dichromatic dye, and for the polarizer sheet layer of the invention, the uniaxially oriented sheet prepared by the iodine doping method or the dye doping method can be used.

The iodine doping method using iodine has the features that the method gives less color specific to the polarizer sheet, and also, a polarizer sheet having a high polarization degree is liable to be obtained, but on the other hand, the method has a fault that the heat resistance is inferior. On the other hand, the dye doping method has a higher heat resistance, and on the other hand, there is a problem that the hue specific to the dye for doping appears on the polarizing sheet.

The protective sheet layer used in the invention is a generally a sheet formed by extrusion molding or solvent method cast molding.

As the protective sheet layer formed by extrusion molding, there are sheets of thermoplastic resins including a polycarbonate-base; a polyamide-base; a polyester-base; a polystyrene-base; an acrylic-base including homopolymers and copolymers of, e.g., methyl methacrylate or cyclohexyl methacrylate; a vinyl chloride-base; a polystyrene/methyl methacrylate-base; an acrylonitrile/styrene-base; poly-4-methylpentene-1; a main chain hydrocarbon-base having an andamantan ring or a cyclopentane ring as the main chain; a polyurethane-base; and a cellulose-base such as triacetyl cellulose, etc.

As the protective sheet of the polarizer sheet layer, the optical anisotropy is desirably as less as possible, and for the purpose of reducing the formation of the optical anisotropy, the resins having a low photoelastic coefficient, such as acetyl celluloses such as triacetyl cellulose, diacetyl cellulose, etc.; propyl celluloses such as tripropyl cellulose, dipropyl cellulose, etc.; and the main chain hydrocarbon-base resins such as polymethyl methacrylate, "Arton" manufactured by JSR Corporation, "Zeonex" manufactured by Nippon Zeon Corporation, "Apel" manufactured by MITSUI CHEMICALS, INC., etc., having an andamantan ring or a cyclopentane ring as the main chain are recommended. Of these compounds, acetyl cellulose and propyl cellulose are preferably used in the invention.

As the production method of the protective sheet, for the purpose of reducing an optical anisotropy as less as possible, a protective sheet molded by a solvent method cast molding method is preferred.

For forming the protective sheet layer by a solvent method cast molding method, it is preferred that the resin can be dissolved in a solvent of a low boiling point, which can be easily removed, at a high concentration. For the purpose, acetyl celluloses such as triacetyl cellulose, diacetyl cellulose, tripropyl cellulose, dipropyl cellulose, etc.; propyl celluloses; the main chain hydrocarbon-base resins such as "Arton" manufactured by JSR Corporation, "Zeonex" manufactured by Nippon Zeon Corporation, "Apel" manufactured by MITSUI CHEMICALS, INC., etc., having an andamantan ring or a cyclopentane ring as the main chain; polycarbonate resins such as polybisphenol A carbonate, etc.; a polymethyl methacrylate resin; and the like are preferred. Of these polymers, acetyl celluloses and propyl celluloses are particularly preferably used from the viewpoints of high transparency, the simplicity of coloring, and the easiness of the sheet production.

About the solvent method cast molding method, in one of the production methods, the protective sheet layer is prepared by a method of removing the solvent from a polymer solution cast on a belt or a flat plate by heating or a reduced pressure treatment. The protective sheet layer molded by the solvent method cast molding method having a thickness of from about 0.01 to 1.5 mm, and preferably from about 0.02 to 1.2 mm is particularly preferably used. When the thickness is thinner than 0.01 mm, the preparation itself of such a protective sheet layer becomes difficult. On the other hand, when the thickness exceeds 1.5 mm, the uniform removal of solvent becomes difficult, and the production cost is liable to increase.

As the polarizing plate of the invention, a polarizing plate prepared by sticking the protective sheet to both surfaces of the polarizer sheet with an adhesive or a pressure-sensitive adhesive in the form of holding the polarizer sheet layer between the protective layers is recommended. An adhesive or a pressure-sensitive adhesive is required to have durability to water, heat, light, etc., for a long period of time and fundamentally, there is no particular restriction on them if they meet the above requirements.

Examples of the adhesive include isocyanate-base, polyurethane-base, polythiourethane-base, epoxy-base, vinyl acetate-base, acrylic-base, wax-base adhesives, etc. Examples of the pressure-sensitive adhesive include vinyl acetate-base, acrylic-base pressure-sensitive adhesives, etc.

The adhesive or the pressure-sensitive adhesive can be uniformly coated on the protective sheet or the polarizer sheet by a coating method, which is usually used, such as a gravure coating method, an offset coating method, etc. The thickness of the adhesive layer or the pressure-sensitive adhesive layer is usually from 0.1 to 100 $\mu$m, and preferably from 0.5 to 80 $\mu$m. When the thickness of the adhesive layer or the pressure-sensitive adhesive layer is thinner than 0.1 $\mu$m, the bonding force is low, and when the thickness exceeds 100 $\mu$m the adhesive or the pressure-sensitive adhesive sometimes oozes out from the end portions of the optical composite.

After coating the adhesive or the pressure-sensitive adhesive beforehand or coating directly before sticking, the sheets are superposed each other directly from a roll or in cut states, and, if necessary, by carrying out a curing treatment, they are bonded to each other.

For the purpose of improving the bonding force between the sheet layers by the adhesive layer or the pressure-sensitive adhesive layer, the surfaces of the protective sheet and the polarizer sheet are sometimes subjected to a chemical liquid treatment with an acid or an alkali, a ultraviolet treatment, a plasma or corona discharging treatment beforehand.

Then, the resin sheet in the invention is explained. Examples of the sheets used as the resin sheet include sheets of thermoplastic resins including a polycarbonate-base; a polyamide-base; a polyester-base; a polystyrene-base; an acrylic-base including homopolymers and copolymers of, e.g., methyl methacrylate or cyclohexyl methacrylate; a vinyl chloride-base; a polystyrene/methyl methacrylate-base; an acrylonitrile/styrene-base; poly-4-methylpentene-1; a main chain hydrocarbon-base having an andamantan ring or a cyclopentane ring in the main chain; a polyurethane-base; and a cellulose-base such as triacetyl cellulose, etc.

It is desirable that the optical anisotropy is as less as possible, but from the viewpoints of high transparency, a colorlessness, a high impact resistance, a high heat resistance, etc., a polycarbonate, s polyamide, and a polyester are particularly preferably used.

As the polycarbonate, there is polybisphenol A carbonate. Other examples of the polycarbonate include homopolymer carbonates of 1,1'-dihydroxydiphenyl-phenylmethylmethane, 1,1'-dihydroxydiphenyl-diphenylmethane, 1,1'-dihydroxy-3,3'-dimethyldiphenyl-2, 2'-propane, copolymer polycarbonates of them each other, and copolymer carbonates with bisphenol A. In this invention, these are generally called a polycarbonate.

In general, one of the faults of the polycarbonate is that the double refraction is liable to become large. That is, in the inside of the moldings, the optical anisotropy caused by the molding strain or the local orientation is liable to occur. Accordingly, in the case of using a polycarbonate in the invention, it is important to prevent the formation of the optical anisotropy as completely as possible, and as the counterplan, it is preferred to use a resin, which has a high fluidity, hardly receives the shearing stress at molding, that is, hardly causes a residual strain and a local orientation, and has a relatively low polymerization degree. In the invention, the use of polycarbonate having a polymerization degree of not larger than 120, and preferably not larger than 100 is recommended.

Examples of the polyamide include the polycondensation products of diamine components such as hexamethylenediamine, m-xylyleneamine, bis(p-aminocyclohexy)methane, 3,3-dimethyl-4,4-diaminodicyclohexymethane, trimethylhexamethylenediamine, etc., and dicarboxylic acid components such as adipic acid, dodecanoic diacid, isophthalic acid, terephthalic acid, etc.; and the polycondensation products of lactams such as caprolactam, etc.

Particularly, because of the necessity of high transparency, the polyamide, which is called amorphous nylon or transparent nylon, is preferably used. "Glilamid TR-55" and "Grilamid TR-90" manufactured by EMS-CHEMIE AG. and "Trogamid CX-7323" manufactured by Huels AG. etc., are suitably used. The transparent nylon has the feature of generally less in the optical anisotropy. Also, there is a tendency that the solvent resistance is higher than polycarbonate.

The polyester includes the polycondensation products of dicarboxylic acids such as terephthalic acid, isophthalic acid, etc., and diols such as ethylene glycol, butylene glycol, 1,4-cyclohexane dimethanol, etc., and polyethylene terephthalate and the copolymers thereof, polybutylene terephthalate and the copolymers thereof are suitably used.

The resin sheet layer has substantially no molecular orientation property but if any, it is preferred that the property is vanished.

As the production method of the resin sheet layer, there are a method (T-die method) of receiving a polymer melt extruded from a nozzle of a long sideways on a holding apparatus or a traveling belt and setting to a sheet form in the state of with or without carrying out stretching in the lengthwise direction or the width direction accompanied with a molecular orientation and a method (tubular method) of extruding a resin into a balloon form and setting.

As not only the sheets of polycarbonate, polyamide, and polyester, but also any sheets used as the resin sheet layer in the invention, a non-stretched sheet including one by the solvent method cast molding or a lightly biaxially oriented sheet is preferred, but in the case of a resin, which hardly causes optical anisotropy, the sheet of the resin is excepted from the rule.

Also, the resin sheet layer having a thickness of from about 0.01 to 2.0 mm, and preferably from about 0.03 to 1.5 mm is generally used. When the thickness is thinner than 0.01 mm, the heat bonding property of the resin sheet layer to a thermoformed resin layer described below is liable to be lowered. On the other hand, when the thickness exceeds 2.0 mm, the bending rigidity of the resin sheet increases, whereby there is a possibility of lowering the laminating property and the workability.

For preparing the optical composite of the invention, as an intermediate stage, a method of first preparing a composite (hereinafter, is referred to as an intermediate composite) by adhering one protective sheet of the polarizing plate to the resin sheet layer with an adhesive or a pressure-sensitive adhesive is recommended.

Examples of the adhesives include isocyanate-base, polyurethane-base, polythiourethane-base, epoxy-base, vinyl acetate-base, acrylic-base, wax-base adhesives, etc. Examples of the pressure-sensitive adhesive include vinyl acetate-base, acrylic-base pressure-sensitive adhesives, etc.

The adhesive or the pressure-sensitive adhesive can be uniformly coated on the polarizing plate or the resin sheet by a coating method, which is usually used, such as a gravure coating method, an offset coating method, etc. The thickness of the adhesive layer or the pressure-sensitive adhesive layer is usually from 0.1 to 100 μm, and preferably from 0.5 to 80 μm. When the thickness of the adhesive layer or the pressure-sensitive adhesive layer is thinner than 0.1 μm, the bonding force is low, and when the thickness exceeds 80 μm, the adhesive or the pressure-sensitive adhesive sometimes oozes out from the end portions of the optical composite.

After coating the adhesive or the pressure-sensitive adhesive beforehand or coating directly before sticking, the polarizing plate and the resin sheet are superposed each other directly from a roll or in cut states, and, if necessary, by carrying out a curing treatment, they can be bonded to each other.

For the purpose of improving the bonding force between the sheet layers by the adhesive layer or the pressure-sensitive adhesive layer, the surfaces of the polarizing plate and the resin sheet are sometimes subjected to a chemical liquid treatment with an acid or an alkali, a ultraviolet treatment, a plasma or corona discharging treatment beforehand.

Then, the thermoformed resin layer in the invention is explained. The material used for the thermoformed resin layer preferably includes thermoplastic resins including a polycarbonate-base; a polyamide-base; a polyester-base; a polystyrene-base; an acrylic-base including homopolymers and copolymers of, e.g., methyl methacrylate or cyclohexyl methacrylate; a vinyl chloride-base; a polystyrene/methyl methacrylate-base; an acrylonitrile/styrene-base; poly-4-methylpentene-1; a main chain hydrocarbon-base having an andamantan ring or a cyclopentane ring in the main chain; a polyurethane-base; and a cellulose-base such as triacetyl cellulose, etc.

In the invention, there is no particular restriction on the thermoplastic resin if the resin sheet layer and the thermoformed resin layer are thermally adhered to each other.

It is desirable that the thermoformed resin layer has optical anisotropy as less as possible, but from the view-points of high transparency, colorlessness, high impact resistance, high heat resistance, etc., a polycarbonate, a polyamide, and a polyester are particularly preferably used.

As the polycarbonate, there is polybisphenol A carbonate. Other examples of the polycarbonate include homopolymer carbonates of 1,1'-dihydroxydiphenyl-phenylmethylmethane, 1,1'-dihydroxydiphenyl-diphenylmethane, 1,1'-dihydroxy-3,3'-dimethyldiphenyl-2,2'-propane, copolymer polycarbonates of them each other, and copolymer carbonates with bisphenol A.

In general, one of the faults of the polycarbonate is that the double refraction is liable to become large. That is, in the inside of the moldings, the optical anisotropy caused by the molding strain or the local orientation is liable to occur. Accordingly, in the case of using a polycarbonate in the invention, it is important to prevent the formation of the optical anisotropy as completely as possible, and as the counterplan, it is preferred to use a resin, which has a high fluidity, hardly receives the shearing stress at molding, that is, hardly causes a residual strain and a local orientation, and has a relatively low polymerization degree. In the invention, the use of polycarbonate having a polymerization degree of not larger than 120, and preferably not larger than 100 is recommended.

Examples of the polyamide include the polycondensation products of diamine components such as hexamethylenediamine, m-xylyleneamine, bis(p-aminocyclohexy)methane, 3,3-dimethyl-4,4-diaminodicyclohexymethane, trimethylhexamethylenediamine, etc., and dicarboxylic acid components such as adipic acid, dodecanoic diacid, isophthalic acid, terephthalic acid, etc.; and the polycondensation products of lactams such as caprolactam, etc.

Particularly, because of the necessity of being high transparency, the polyamide, which is called amorphous nylon or transparent nylon, is preferably used. "Glilamid TR-55" and "Glilamid TR-90" manufactured by EMS-CHEMIE AG and "Trogamid CX-7323" manufactured by Huels AG, etc., are suitably used. The transparent nylon has the feature of generally less in the optical anisotropy. Also, there is a tendency that the solvent resistance is higher than polycarbonate.

The polyester includes the polycondensation products of dicarboxylic acids such as terephthalic acid, isophthalic acid, etc., and diols such as ethylene glycol, butylene glycol, 1,4-cyclohexane dimethanol, etc., and polyethylene terephthalate and the copolymers thereof, polybutylene terephthalate and the copolymers thereof are suitably used.

Because it is necessary that the resin sheet layer is heat adhered to the thermoformed resin layer with an adhesive strength of a practical use level, it is preferred that the resin of the resin sheet layer and the resin of the thermoformed resin layer are resins of the same family. When both the resins are made of the same resin, the invention is particularly preferably attained.

By illustrating a method of heat adhering the thermoformed resin layer to the resin sheet layer of the intermediate composite, a method of preparing the optical composite of the invention is explained.

Thermoforming means that a heat molten resin is forced in a mold and molded or formed, by a compression molding method, a transfer molding method, an injection molding method, etc. From the productivity and the preciseness, the insert injection molding method as described in Japanese Patent Application No. 49707/1998 is preferred.

That is, the insert injection method is a method of disposing the intermediate composite with the surface to be heat adhered facing the inside of a mold at one surface side of the mold and injection molding the resin layer to the surface.

Of these methods, for the uses requiring particularly precision, such as sunglasses, goggles, corrective lenses, etc., an insert type injection compression molding method is preferred. Because the injection compression molding method employs a method that after injecting a resin in a mold at a low pressure, the mold is closed at a high pressure to apply a compressing force to the resin, optical anisotropy caused by the molding strain and the local orientation at molding is hardly generated in the moldings. Also, by controlling the mold compression force uniformly applied to the resin, the resin can be cooled at a definite specific volume, whereby the moldings having a high dimensional precision are obtained.

The above-described method is particularly preferably applied to a polycarbonate-base resin having large double refraction.

When the thickness of the intermediate composite portion in the invention is A, and the thickness of the thermoformed resin layer is B, the thickness A is a uniform thickness of usually from about 0.03 mm to 3 mm in the whole region of the optical composite of the invention. On the other hand, in the thickness B, there are a case of uniform thickness and a case of a prescription lens having a thickness continuously differing from the center portion towards the periphery thereof, such as a minus-diopter lens and a plus-diopter lens. Within a radius of 35 mm from the center of the optical composite, in the invention, it is preferred that the thickness B is usually in the range of from about 0.5 mm to 20 mm for practical use.

The reason that the thickness of lens is increased in an in-mold treatment is as follows.

For example, a lens having no corrective diopter (refractive power) called a plano such as sunglass lens is seen as a parallel form having a difference of the thickness only of the lens in the curvatures of the convex surface and the concave surface. However, in such a form, when the lens is formed to a spherical surface, spherical aberration occurs.

For example, when a 6-curve lens having a thickness of 2 mm is formed, the lens has a diopter (refractive power) of about −0.1D.

Not only the spherical aberration is the optically common sense, but also the design of lens is disclosed in Ph.D., Sachigoro Yamada, *Kogaku no Chishiki* (Knowledge of optics), published by Tokyo Denki University Press, February 1966. When a lens is designed by the formula:

$$r1 = r2 + ((n-1)t/n)$$

or $$r2 = r1 - ((n-1)t/n)$$

wherein r1 is a convex surface of the lens; r2 is a concave surface of the lens; n is the refractive index of the lens material; and t is a thickness of the lens, a lens excluding the spherical aberration and being optically excellent can be prepared. In the cross section of a meniscus lens prepared by the design of the formula passing the optical center thereof, the convex surface is not parallel to the concave surface, and the thickness of the lens is thick at the optical center and becomes gradually thinner to the peripheral portion. As described above, for vanishing the spherical aberration, by bending the polarizing plate in a spherical surface form, an ideal Plano lens cannot be obtained and thus injection molding in a mold designed such that the spherical aberration is corrected is necessary.

In the invention, as the preferred embodiment of the optical composite, it is recommended to control that the visible light transmittance is from 10 to 80%, and particularly from 15 to 70%. When the visible light transmittance is less than 10%, when the optical complex is used for a goggle, etc., the field of view is too dark, and it is quite capable of hindering the free behavior. Also, when the visible light transmittance exceeds 80%, the mitigating effect to dazzling is reduced.

For realizing the above-described range of the visible light transmittance, there is a method of incorporating a coloring matter such as a dye, a pigment, etc., in at least one layer of the polarizer sheet layer, the protective sheet layers, the resin sheet layer, and the thermoformed resin layer. Also, there is a method of incorporating a coloring matter such as a dye, a pigment, etc., in at least one layer of the adhesive layer or the pressure-sensitive adhesive layer. However, it is easy to incorporate the coloring matter in one layer of the above-described various layers, the thermoformed resin layer, the adhesive layer and the pressure-sensitive adhesive layer, whereby the purpose can be sufficiently attained.

The coloring matter used may be a dye or a pigment, but in a high-transparency feeling, a dye is generally preferred. On the other hand, in the viewpoint of the durability of the long period of time to water, heat, light, etc., a pigment is generally preferred.

There are no particular restrictions on the kinds of the dye or pigment used in the invention if they have durability of a long period of time to color fading, etc. Dyes used in the invention generally include azo-base, anthraquinone-base, indigoid-base, triphenylmethane-base, xanthene-base, and oxazine-base dyes. Also, the pigments used in the invention include phthalocyanine-base, quinacridone-base, and azo-base organic pigments, and inorganic pigments such as ultramarine blue, chrome green, cadmium yellow, etc.

Then, typical examples of each layer construction of the optical composite of the invention are shown below. In this case, the polarizer sheet layer is shown by P, the protective sheet layer by H, the resin sheet layer by S, and the thermoformed resin layer by T, respectively; and as the kinds of the resins, a polyvinyl alcohol-base resin is shown by (v), an acetyl cellulose-base by (ac), a polycarbonate-base by (c), a polyamide-base by (am), and a polyester-base by (e), respectively. Also, the adhesive layer or the pressure-sensitive adhesive layer is shown by / and the heat adhered portion by //, respectively. The protective sheet layer H is illustrated by an acetyl cellulose-base resin, but a polycarbonate-base resin or the resins having a low optical elastic coefficient are preferably used as H.

(1) H(ac)/P(v)/H(ac)/S(c)//T(c)

(2) H(ac)/P(v)/H(ac)/S(am)//T(am)

(3) H(ac)/P(v)/H(ac)/S(e)//T(e)

It is preferred that in the optical composite of the invention, the surface of at least one side is subjected to hard coat processing. As the hard coat, any type of hard coat, which is generally used, for example, a thermosetting type hard coat such as a silane-base, an epoxy-base, etc., and an active ray-setting type hard coat such as an acrylic-base, an epoxy-base, etc., may be used. Usually, the hard coat is applied in the thickness of from about 0.5 to 15 μm, but as the case may be, for the purpose of improving the adhesion, etc., the hard coat is sometimes applied onto a primer coat layer such as an acrylate-base resin layer coated on the surface.

Also, it is preferred that in the optical composite of the invention, the surface of at least one side is subjected to reflection preventing processing. For the reflection preventing processing, usually, about 2 to 8 inorganic film layers, wherein the refractive indexes of the adjacent layers differ from each other are laminated on the hard coat by a vacuum vapor deposition method at an optical film thickness or about 1 to 3 organic film layers are laminated on the hard coat by a wet method at an optical film thickness.

Also, it is preferred that in the optical composite of the invention, the surface of at least one side is subjected to anti-fogging processing. For the anti-fogging processing, usually, a hydrophilic resin such as a polyvinyl alcohol-base resin, a polyvinyl pyrrolidone-base resin, etc. is applied at a film thickness of from about 1 to 50 $\mu$m. Also, in the case of an acetyl cellulose-base resin, by saponification treatment of the surface thereof, an anti-fogging property is imparted.

Also, it is preferred that in the optical composite of the invention, the surface of at least one side is subjected to stain preventing processing. For the stain preventing processing, usually, for the purpose of preventing with organic materials, such as stains by fingerprints, etc., of the reflection preventing film layer, and easily wiping off the stains, a fluorine-base organic compound is applied at a film thickness of an order of from several tens nm to several $\mu$m by a vacuum vapor deposition method or a wet method.

Also, it is preferred that in the optical composite of the invention, the surface of at least one side is subjected to mirror processing. For the mirror processing, usually, the film of a metal such as aluminum, silver, gold, platinum, etc., is applied on the hard coat by a vacuum vapor deposition method.

As the polarizer sheet of the polarizing lens of the invention, an iodine-base polarizer sheet formed by combining polyvinyl alcohol and iodine and a dye-base polarizer sheet formed by combining polyvinyl alcohol and a dye are commercially available. The iodine-base polarizer sheet is excellent in the polarizing performance but is weak in the heat resistance, and at a high temperature, iodine is sublimed, and the polarizing performance is sometimes vanished. On the other hand, the dye-base polarizer sheet is inferior in the polarizing performance to some extent but has a feature that the heat resistance is high.

Then, the production method of the polarizing lens is explained. The polarizer sheet is prepared by stretching polyvinyl alcohol and impregnating the stretched sheet with iodine or a dye. Thereafter, for processing the sheet to a polarizing lens, there are following methods and steps.

(1) To cut a polarizer sheet into a lens form→to heat bend the sheet→to laminate both the surfaces thereof with a glass to form a glass-made polarizing lens.

(2) To cut a polarizer sheet into a lens form→to heat bend the sheet→to support the polarizer sheet in the middle of a glass mold and to inject a CR 39 monomer→to heat curing the sheet→to form a CR 39-made polarizer lens.

(3) To laminate a polarizer sheet with a protective sheet →to cut the sheet into a lens form→to thermoform the lens →to form a polarizing lens of triacetate or a polarizer lens of polycarbonate.

(4) To laminate a polarizer sheet with a protective sheet →to cut the sheet into a lens form→to thermoform the lens →to subject to in-mold treatment→to form a polycarbonate-made formed polarizing lens.

In the method (1), a previously thermoformed glass is used for both surfaces of the thermoformed polarizer sheet in place of the protective sheet of a plastic and is laminated with an adhesive. Accordingly, one side of the polarizer sheet is constructed of the material of one kind of glass only.

In the method (2), after supporting the thermoformed polarizer sheet in the middle of a glass mold, the glass mold is filled with a mixed liquid of the CR 39 monomer and a catalyst, and the liquid is cured by heating. In this case, one side of the polarizer sheet of the polarizing lens prepared is also constructed of the material of one kind of CR 39 only.

In the polarizing lens prepared by the method (3), triacetate or polycarbonate is used as the protective sheet of the polarizer sheet, and in the case of triacetate, the iodine-base polarizer sheet is used. But, when the protective sheet is made of polycarbonate, a dye-base polarizer sheet is used from the viewpoint of the heat resistance at thermoforming, which is carried out thereafter. After cutting the polarizing plate into a size of capable of obtaining a lens, the polarizing plate is thermoformed at the temperature environment of 80° C. in the case of triacetate and 130° C. in the case of polycarbonate, respectively. In the polarizing lens prepared by the method, one side of the polarizer sheet layer is constructed of a material of one kind, such as triacetate or polycarbonate, etc.

In the method (4), after cutting the polarizing plate using polycarbonate as the protective sheet into a size capable of obtaining a lens, the polarizing plate is thermoformed and, thereafter, the heat bent plate is supported at the convex side of the injection mold of a lens, and polycarbonate of the same material as that of the protective sheet is injection molded to the concave side of the lens in a body. In this method, from the viewpoint of the heat resistance at thermoforming, a dye-base is used. The technique is disclosed in Japanese Patent Laid-Open No. 52817/1996. Even in the polarizing lens prepared by the method, one side of the polarizer sheet layer is constructed of the material of only one kind of polycarbonate. When the material injection molded directly to the surface of triacetate is polycarbonate, the material cannot be heat-welded thereto because of the different material.

As described above, in the above-described embodiment, by using the polarizing plate holding the iodine-base polarizer excellent in the polarizing performance between triacetate films, and further subjecting the polarizing plate to an in-mold treatment with a material excellent in the impact resistance, a polarizing lens excellent in the polarizing performance and further excellent in the impact resistance can be supplied.

As described above, since triacetate is a different material from polycarbonate, they cannot be directly heat-welded by injection molding. A sheet of a polarizing composite formed by laminating a polycarbonate film with an adhesive to one side of a polarizing plate holding a polarizer between triacetate sheets is prepared, and after cutting into a size capable of obtaining a lens, the cut sheet is thermoformed such that the polycarbonate surface becomes a concave surface, but since it can be thermoformed at the thermoforming temperature of triacetate, the polarizing performance of the iodine-base polarizer is not lost. Then, the thermoformed polarizing composite is supported at the convex side of an injection mold of lens, and by injection molding with polycarbonate, a polarizing lens can be prepared. The lens prepared by the method has the feature that the concave side is constructed of different two kinds of materials of triacetate and polycarbonate.

Accordingly, by the above-described embodiment of the invention, because the polarizer sheet layer has at one side thereof at least two layers constructed of materials different each other in a body, a polarizing lens excellent in the polarizing performance and also excellent in the impact resistance can be supplied.

Also, after laminating a nylon film onto one side of triacetate film, by injection molding with nylon, a lighter lens excellent in the impact resistance and also more excellent in the chemical resistance than polycarbonate can be supplied. Also, by combining various kinds of materials, polarizing lenses having various features can be prepared by the same method.

Also, when the product is used for not only a polarizing lens but also a polarizing plate of a liquid crystal display plate, in the case of incorporating the polarizing plate to the cover of the window of the display, they can be integrally molded, whereby different from the case of simply accumulating, the occurrence of the interference pattern caused from an air layer formed between the polarizing plate and the cover can be restrained.

Then, the invention is practically explained by the Examples, but the invention is not limited to these Examples.

EXAMPLE 1

As the protective sheet layer, a TAC (triacetyl cellulose) sheet having a thickness of about 80 $\mu$m was used, and a polarizing plate (manufactured by Sumitomo Chemical Company, Limited) holding a polarizer sheet having a thickness of about 40 $\mu$m between the two TAC sheets was prepared.

As the resin sheet layer, a transparent nylon "Grilamid TR-90"(manufactured by EMS-CHEMIE AG.) sheet having a thickness of about 200 $\mu$m was used, and the sheet coated with an acrylic pressure-sensitive adhesive "Saivinol AT-250"(manufactured by Saiden Chemical Industry Co., Ltd.) colored in a gray color with a dye on one surface thereof at a thickness of about 30 $\mu$m was prepared.

By sticking the resin sheet layer onto one surface of the polarizing plate, an intermediate composite was produced.

The intermediate composite was press-molded in a spherical form such that the curvature was the same as the curvature of a concave mold for insert molding, the TAC surface was disposed at the convex side, and the "Grilamid TR-90" side was at the concave side.

The convex side of the spherical intermediate composite obtained was set in a concave mold, and the intermediate composite was sucked to the molding surface of the concave mold from the suction hole of the concave mold to form a cavity for molding between the intermediate composite and the convex mold.

As the thermoformed resin layer, a "Grilamid TR-90" sheet was used, by an injection compression molding method, the "Grilamid TR-90" surface of the intermediate composite was heat-adhered to the thermoformed resin layer, and a lens-form optical composite was insert-molded.

The optical composite obtained is a semi-finished lens of 6C (curve) disposing the polarizing plate at the convex side and having the integrated "Grilamid TR-90" layer having a thickness of about 13 mm at the back surface (concave side).

By polishing the back surface of the lens, a minus lens of −4.00D (diopter) having a central thickness of about 2 mm was prepared.

After coating a silane-base hard coat of a film thickness of about 2.5 $\mu$m on both surfaces of the lens, and further, 4 layers of $ZrO_2$ and $SiO_2$ were alternately laminated at an optical film thickness on both surfaces thereof by a vacuum vapor deposition method to form reflection prevention films. Furthermore, a fluorine-base strain preventing film was coated on each of the reflection preventing films at a thickness of about 20 nm.

In the lens obtained, the visible light transmittance measured at the center portion was 55%, and the lens showed very tough mechanical characteristics. Also, the degree of polarization was at least 99%.

EXAMPLE 2

The resin sheet layer was prepared using polycarbonate having an average polymerization degree of about 80 (manufactured by Idemitsu Petrochemical Company, Limited), and the sheet of a thickness of about 170 $\mu$m was coated with the pressure-sensitive adhesive used in Example 1 at a thickness of about 30 $\mu$m.

By sticking the polycarbonate sheet to one surface of the polarizing plate used in Example 1, an intermediate composite was prepared.

As in Example 1, the intermediate composite was press-molded in a spherical form such that the TAC surface was disposed at the convex side and the polycarbonate surface was at the concave side.

The intermediate composite after press molding was set in a concave mold as in Example 1, and a cavity for molding was formed between the intermediate composite and the convex mold. As the thermoformed resin layer, polycarbonate having an average polymerization degree of about 80 was used, and an optical composite was insert-molded by a method of heat-adhering the thermoformed resin layer to the polycarbonate surface of the intermediate composite by an injection compression molding method.

The optical composite obtained is a Plano lens disposing the polarizing plate at the convex side of the lens and having the integrated polycarbonate layer having a thickness of about 2 mm at the backside.

A silane-base hard coat having a film thickness of about 2.5 $\mu$m was coated on both surfaces of the lens.

In the lens obtained, the visible light transmittance measured at the center portion was 52%, and the lens showed very tough mechanical characteristics.

EXAMPLE 3

The resin sheet layer having a thickness of about 200 $\mu$m was prepared using polyethylene terephthalate (manufactured by Idemitsu Petrochemical Company, Limited), and coated with the pressure-sensitive adhesive used in Example 1 at a thickness of about 30 $\mu$m.

By sticking the polyethylene terephthalate sheet to one surface of the polarizing plate used in Example 1, an intermediate composite was prepared.

As in Example 1, the intermediate composite was press-molded in a spherical form such that the TAC surface was disposed at the convex side and the polyethylene terephthalate surface was at the concave side.

The intermediate composite after press molding was set in a concave mold as in Example 1, and a cavity for molding was formed between the intermediate composite and the convex mold. As the thermoformed resin layer, polyethylene terephthalate was used, and an optical composite was insert-molded by a method of heat-adhering the thermoformed resin layer to the polyethylene terephthalate surface of the intermediate composite by an injection compression molding method.

The optical composite obtained is a Plano lens disposing the polarizing plate at the convex side of the lens and having the integrated polyethylene terephthalate layer having a thickness of about 2 mm at the backside.

An anti-fogging film of a mixed system of polyvinyl alcohol and polyvinyl pyrrolidone having a film thickness of about 6 μm was coated on both surface of the lens. In the lens obtained, the visible light transmittance measured at the center portion was 51%, and the lens showed very tough mechanical characteristics.

EXAMPLE 4

A polarizing plate (manufactured by Tsutsunaka Plastic Industry Co., Ltd.) holding a polarizer sheet having a thickness of about 40 μm sticking via an adhesive layer having a thickness of about 20 μm between two polycarbonate sheets each having a thickness of about 170 μm as the protective sheets, was prepared. By sticking a "Grilamid TR-90" sheet attached with the pressure-sensitive adhesive used in Example 1 to one surface of the polarizing plate, an intermediate composite was prepared.

As in Example 1, the intermediate composite was press-molded in a spherical form such that the polycarbonate surface was disposed at the convex side and the "Grilamid TR-90" surface was at the concave side.

The intermediate composite after press molding was set in a concave mold as in Example 1, and a cavity for molding was formed between the intermediate composite and the convex mold. As the thermoformed resin layer, the "Grilamid TR-90" was used, and an optical composite was insert-molded by a method of heat-adhering the "Grilamid TR-90" to the "Grilamid TR-90" surface of the intermediate composite by an injection compression molding method.

The optical composite obtained is a semi-finished lens of 6C disposing the polarizing plate at the convex side of the lens and having the integrated "Grilamid TR-90" layer of a thickness of about 13 mm at the backside.

By polishing the back surface of the lens, a minus lens of −4.00 D (diopter) having the central thickness of about 2 mm was prepared.

After coating a silane-base hard coat of a film thickness of about 2.5 μm on both surfaces of the lens, 4 layers of $ZrO_2$ and $SiO_2$ were alternately laminated at an optical film thickness on both surfaces thereof by a vacuum vapor deposition method to form reflection prevention films. Furthermore, a fluorine-base strain preventing film was coated on each of the reflection preventing films at a thickness of about 20 nm.

In the lens obtained, the visible light transmittance measured at the center portion was 54%, and the lens showed very tough mechanical characteristics.

EXAMPLE 5

A polarizing plate holding a polarizer sheet having a thickness of about 40 μm sticking via an adhesive layer having a thickness of about 15 μm between two "Arton G" sheets each having a thickness of about 200 μm prepared from "Arton G" (manufactured by JSR Corporation) having an andamantan ring at the main chain, as the protective sheets, was prepared. By sticking a "Grilamid TR-90" sheet attached with the pressure-sensitive adhesive used in Example 1 to one surface of the polarizing plate, an intermediate composite was prepared.

As in Example 1, the intermediate composite was press-molded in a spherical form such that the "Arton G"surface was disposed at the convex side, and the "Grilamid TR-90" surface was at the concave side.

The intermediate composite after press molding was set in a concave mold as in Example 1, and a cavity for molding was formed between the intermediate composite and the convex mold. As the thermoformed resin layer, the above-described "Arton G" was used, and an optical composite was insert-molded by a method of heat-adhering "Arton G" to the "Arton G" surface of the intermediate composite by an injection compression molding method.

The optical composite obtained is a Plano lens disposing the polarizing plate at the convex side of the lens and having an integrated "Arton G" layer of a thickness of about 2 mm at the backside.

A silane-base hard coat having a film thickness of about 2.5 μm was coated on both surfaces of the lens.

In the lens obtained, the visible light transmittance measured at the center portion was 55%, and the lens showed very tough mechanical characteristics. Also, the degree of polarization thereof was at least 99%.

According to the invention, an optical composite having a strong impact strength and a high degree of polarization can be provided, and by using the optical composite of the invention, goggles, sunglasses, and spectacles, which are more safety and can prevent dazzle, can be provided.

What is claimed is:

1. A polarizing lens prepared by a method comprising:
   attaching a film to one side of a polarizing plate;
   placing the polarizing plate and film in a mold,
   injection molding a material into the mold, thereby integrating the film with the polarizing plate,
   wherein the polarizing plate comprises a polarizer sheet layer disposed between triacetate sheets, and the film and injection molded material have the same composition.

2. A polarizing lens prepared by a method comprising:
   attaching a film to one side of a polarizing plate;
   placing the polarizing plate and film in a mold,
   injection molding a material into the mold, thereby integrating the film with the polarizing plate,
   wherein the polarizing plate comprises a polarizer sheet disposed between a triacetate sheet and a protective sheet, and the protective sheet layer and triacetate layer have different compositions.

3. A polarizing lens prepared by a method comprising:
   attaching a film to one side of a polarizing plate;
   placing the polarizing plate and film in a mold,
   injection molding a material into the mold, thereby integrating the film with the polarizing plate,
   wherein the polarizing plate comprises a polarizer sheet layer disposed between two polycarbonate sheets, and the compositions of the polycarbonate layers are different.

4. The polarizing lens of claim 1, wherein the film and injection molded material comprise a polycarbonate.

5. The polarizing lens of claim 1, wherein the film and injection molded material comprise a nylon.

6. A polarizing lens prepared by a method comprising:
   attaching a film to one side of a polarizing plate;
   placing the polarizing plate and film in a mold,
   injection molding a material into the mold, thereby integrating the film with the polarizing plate,
   wherein the polarizing plate has a concave and convex side and comprises a polarizer sheet disposed between two protective sheets,
   the protective sheets each comprise a thermoplastic resin selected from the group consisting of a polyamide, a polyester, a polystyrene, an acrylic, homopolymers and copolymers of methylmethacrylate, homopolymers and copolymers of cyclohexylmethacrylate vinyl chloride, polystyrene/methylmethacrylate acrylonitrile/styrene, poly-4-methylpentene-1, main chain hydrocarbon resin having an adamantan ring or a cyclopentane ring in the main chain, a polyurethane, a cellulosic resin, and triacetyl cellulose, and at least two layers each having a different composition are disposed on the concave side of the polarizing plate.

7. Goggles or spectacles comprising the polarizing lens of claim 1.

8. Goggles or spectacles comprising the polarizing lens of claim 3.

9. Goggles or spectacles comprising the polarizing lens of claim 3.

10. Goggles or spectacles comprising the polarizing lens of claim 4.

11. Goggles or spectacles comprising the polarizing lens of claim 5.

12. Goggles or spectacles comprising the polarizing lens of claim 6.

13. The polarizing lens of claim 1, wherein the polarizer sheet comprises a uniaxially oriented sheet of resin.

14. The polarizing lens of claim 2, wherein the polarizer sheet comprises a uniaxially oriented sheet of resin.

15. The polarizing lens of claim 3, wherein the polarizer sheet comprises a uniaxially oriented sheet of resin.

16. The polarizing lens of claim 4, wherein the polarizer sheet comprises a uniaxially oriented sheet of resin.

17. The polarizing lens claim 5, wherein the polarizer sheet comprises a uniaxially oriented sheet of resin.

18. The polarizing lens of claim 6, wherein the polarizer sheet comprises a uniaxially oriented sheet of resin.

19. The polarizing lens of claim 1, wherein the polarizer sheet is adhered to the triacetate sheets with an adhesive.

20. The polarizing lens of claim 2, wherein the polarizer sheet is adhered to the triacetate sheet and the protective sheet with an adhesive.

21. The polarizing lens of claim 3, wherein the polarizer sheet is adhered to the polycarbonate sheets with an adhesive.

22. The polarizing lens of claim 4, wherein the polarizer sheet is adhered to the triacetate sheets with an adhesive.

23. The polarizing lens of claim 5, wherein the polarizer sheet is adhered to the triacetate sheets with an adhesive.

24. The polarizing lens of claim 6, wherein the polarizer sheet is adhered to the protective sheets with an adhesive.

* * * * *